US012799787B2

(12) United States Patent
Salice

(10) Patent No.: US 12,799,787 B2
(45) Date of Patent: Nov. 17, 2026

(54) DRIVE DEVICE FOR FOLDABLE DOORS OF WARDROBES, WALK-IN CLOSETS OR PIECES OF FURNITURE IN GENERAL

(71) Applicant: ARTURO SALICE S.P.A., Novedrate (IT)

(72) Inventor: Sergio Salice, Carimate (IT)

(73) Assignee: ARTURO SALICE S.P.A., Novedratese (IT)

( * ) Notice: Subject to any disclaimer, the term of this patent is extended or adjusted under 35 U.S.C. 154(b) by 157 days.

(21) Appl. No.: 18/720,460

(22) PCT Filed: Jan. 27, 2023

(86) PCT No.: PCT/EP2023/051971

§ 371 (c)(1),
(2) Date: Jun. 14, 2024

(87) PCT Pub. No.: WO2023/151964

PCT Pub. Date: Aug. 17, 2023

(65) Prior Publication Data

US 2025/0084684 A1 Mar. 13, 2025

(30) Foreign Application Priority Data

Feb. 10, 2022 (IT) ........................ 102022000002462

(51) Int. Cl.
*E05F 5/02* (2006.01)
*E05D 15/26* (2006.01)
(Continued)

(52) U.S. Cl.
CPC .......... *E05D 15/266* (2013.01); *E05F 1/1041* (2013.01); *E05F 5/02* (2013.01);
(Continued)

(58) Field of Classification Search
CPC ..... E05D 15/266; E05D 15/264; E05D 15/26; E05F 1/1041; E05F 5/02; E05F 5/06;
(Continued)

(56) References Cited

U.S. PATENT DOCUMENTS 2,667,221 A * 1/1954 Terry .................... E05D 15/264 160/188
3,017,926 A * 1/1962 Kauppila .............. E05D 15/264 160/213
(Continued)

FOREIGN PATENT DOCUMENTS

DE 3831963 3/1990
DE 3831963 A1 * 3/1990 ........... E05D 15/264
(Continued)

OTHER PUBLICATIONS

International Search Report of PCT Application No. PCT/EP2023/051971, Mailed Mar. 20, 2023.
(Continued)

*Primary Examiner* — Phi D A
(74) *Attorney, Agent, or Firm* — Ferguson Case Orr Paterson

(57) ABSTRACT

The drive device for foldable doors of wardrobes (10), walk-in closets or pieces of furniture comprises a sliding guide (18) fixable to a horizontal wall (11, 12) of the box-shaped body of the wardrobe (10) longitudinally to the front side of the wardrobe (10), at least one guide slider (19) slidably movable along said sliding guide (18), at least one drive member (20) rotatably connected to said at least one guide slider (19) and rotatably connectable to a first (17') or a second (17") leaf of the foldable door (17), and biasing means (22) connected to said drive member (20) for driving a closing and/or opening movement of the foldable door (17).

11 Claims, 5 Drawing Sheets

(51) Int. Cl.

| | |
|---|---|
| ***E05F 1/10*** | (2006.01) |
| ***E05F 5/06*** | (2006.01) |
| ***E05F 15/63*** | (2015.01) |

(52) U.S. Cl.
CPC ................ *E05F 5/06* (2013.01); *E05F 15/63* (2015.01); *E05Y 2201/46* (2013.01); *E05Y 2201/604* (2013.01); *E05Y 2201/708* (2013.01); *E05Y 2900/20* (2013.01)

(58) Field of Classification Search
CPC ......... E05F 15/63; E05F 1/105; E05F 1/1066; E05Y 2201/46; E05Y 2201/604; E05Y 2201/708; E05Y 2900/20; E05Y 2201/624; E05Y 2201/64; E05Y 2201/684
See application file for complete search history.

(56) References Cited

U.S. PATENT DOCUMENTS

| | | | | | |
|---|---|---|---|---|---|
| 3,022,818 | A | | 2/1962 | Rolfe | |
| 3,605,853 | A | | 9/1971 | Osborn | |
| 4,262,448 | A | * | 4/1981 | Flider | E05F 15/72 312/409 |
| 4,887,659 | A | * | 12/1989 | West | E05F 15/605 24/115 F |
| 2009/0178770 | A1 | | 7/2009 | Teunissen | |

FOREIGN PATENT DOCUMENTS

| | | | | | |
|---|---|---|---|---|---|
| DE | 20122310 | U1 * | 2/2005 | E05D 15/26 |
| EP | 0075363 | | 3/1983 | |
| EP | 2078813 | | 7/2009 | |
| EP | 4350112 | A1 * | 4/2024 | E06B 3/482 |
| FR | 2759326 | A1 * | 8/1998 | B60J 5/0497 |
| JP | 2012-180640 | | 9/2012 | |
| KR | 20170120298 | A * | 10/2017 | E05C 3/12 |
| WO | WO-2011155301 | A1 * | 12/2011 | B60J 1/2055 |
| WO | WO-2012159784 | A1 * | 11/2012 | E05D 15/1042 |
| WO | WO-2012159785 | A1 * | 11/2012 | E05D 15/1042 |
| WO | WO-2018073777 | A1 * | 4/2018 | E05D 15/1005 |
| WO | WO-2023151964 | A1 * | 8/2023 | E05F 5/06 |

OTHER PUBLICATIONS

International Written Opinion of PCT Application No. PCT/EP2023/051971, Mailed Mar. 20, 2023.

Japanese Office Action issued in Japanese Application No. 2024-547482 dated Aug. 20, 2026.

* cited by examiner

DRIVE DEVICE FOR FOLDABLE DOORS OF WARDROBES, WALK-IN CLOSETS OR PIECES OF FURNITURE IN GENERAL

CROSS-REFERENCE TO RELATED APPLICATIONS

This application is a National Phase Application of PCT International Application No. PCT/EP2023/051971, having an International Filing Date of Jan. 21, 2023, which claims the benefit of priority to Italian Patent Application No. 10202200000242, filed Feb. 10, 2022, each of which is hereby incorporated by reference in its entirety.

The invention concerns a drive device for foldable doors of wardrobes, walk-in closets or pieces of furniture in general; the invention also concerns a guide and drive system for foldable doors including the above mentioned drive device.

In the furniture sector, wardrobes are known comprising a box-shaped body or structure having a lower wall, an upper wall, side walls and a rear wall defining a containment compartment accessible through a front opening of the wardrobe; in order to close the front opening, wardrobes in general comprise at least one closing door which, depending on the needs of access to the containment compartment or the configuration of the wardrobe, may have a specific movement and/or configuration.

In particular, in the event that the wardrobe has a large front opening, at least one closing door can be provided of the type comprising a first leaf hinged to the box-shaped body and a second leaf hinged to the first leaf in such a way as to be folded on themselves and to be moved towards a side of the wardrobe, thus allowing to completely free the access to the containment compartment.

A closing door of this kind is, for example, known by WO 2019/202377, which comprises a first leaf hinged to the body of the wardrobe, for example at a side wall, as well as it comprises a second leaf hinged to the first leaf in such a way to be movable between a closing position in which the two leaves are coplanarly arranged with each other and an opening position in which the two leaves are folded on themselves and arranged towards a side of the wardrobe.

In order to guide the movement of the closing door, articulated quadrilateral systems are variously known, as illustrated in EP 2839099, connected between the upper wall of the wardrobe and one of the leaves of the door or more simply, as illustrated in WO 2019/202377, the use of a guide rod hinged on the upper wall of the wardrobe and rotatably connected to the second leaf of the closing door is known.

In order to drive the closing and opening movement of the door, a drive device can also be provided, which, as illustrated in WO 2019/202377, for example, can be configured in the form of a telescopic rod hinged to the upper wall of the wardrobe and to the first leaf of the door; the telescopic rod is biased by drawing or biasing magnetic means in such a way as to attract the door towards the closing position or towards the opening position depending on the opening angle of said door.

However, known guide and drive systems and/or devices have several inconveniences, mainly related to the fact that they are difficult to adapt to the different possible configurations for wardrobes, in particular when the dimensions of the wardrobes and/or closing doors vary.

In addition, the known drive devices do not allow an effective control of the movement of the closing door along the entire range of movement from the closing position to the opening position and vice versa, or they do not provide any drive device to help the movement of the door.

The main object of the present invention is therefore to provide a drive device as well as a guide and drive system for foldable doors of wardrobes, walk-in closets or pieces of furniture in general that are easily adaptable to wardrobes or pieces of furniture of different sizes.

Further object of the present invention is to provide a drive device as well as a guide and drive system for foldable doors of the kind mentioned above. that allow the movement of closing and/or opening of the at least one closing door to be effectively driven and controlled, allowing at the same time to change the overall movement of said closing door.

The above can be achieved by means of a drive device for foldable doors of wardrobes, walk-in closets or pieces of furniture in general having a box-shaped body with at least one upper and/or lower horizontal wall and at least one closing door comprising a first leaf hinged to the box-shaped body of the wardrobe or piece of furniture and a second leaf hinged to the first leaf in such a way as to be movable between a closing position in which the two leaves are coplanarly arranged with each other on a front side of the wardrobe and an opening position in which the two leaves are folded on themselves and arranged towards a side of the wardrobe,

- the drive device being fixable to the box-shaped body of the wardrobe or of the piece of furniture and connectable to one of said first and second leaf of the closing door,
- characterized by comprising:
  - a sliding guide fixable to said at least one horizontal wall of the box-shaped body longitudinally to the front side of the wardrobe,
  - at least one guide slider slidably movable along said sliding guide,
  - at least one drive member rotatably connected to said at least one guide slider and rotatably connectable to said first or second leaf of the closing door, and
  - biasing means connected to said drive member for driving said closing and/or opening movement of the closing door.

The above can also be achieved preferentially by means of a guide and drive system for foldable doors of wardrobes, walk-in closets or pieces of furniture in general comprising a drive device according to the invention, as well as a guide device to guide at least said second leaf of the closing door, the guide device comprising a second sliding guide fixable to said at least one horizontal wall of the box-shaped body longitudinally to the front side of the wardrobe, and an additional guide slider slidably movable along said second sliding guide, in which said additional guide slider is rotatably connected to at least said second leaf of the closing door.

Further characteristics of the present invention are also defined in the subsequent claims.

The characteristics and advantages of this invention will be more evident from the subsequent description of a preferential but not exclusive embodiment of the drive device and of the guide and drive system, with reference to the enclosed figures, in which.

Figure 1:
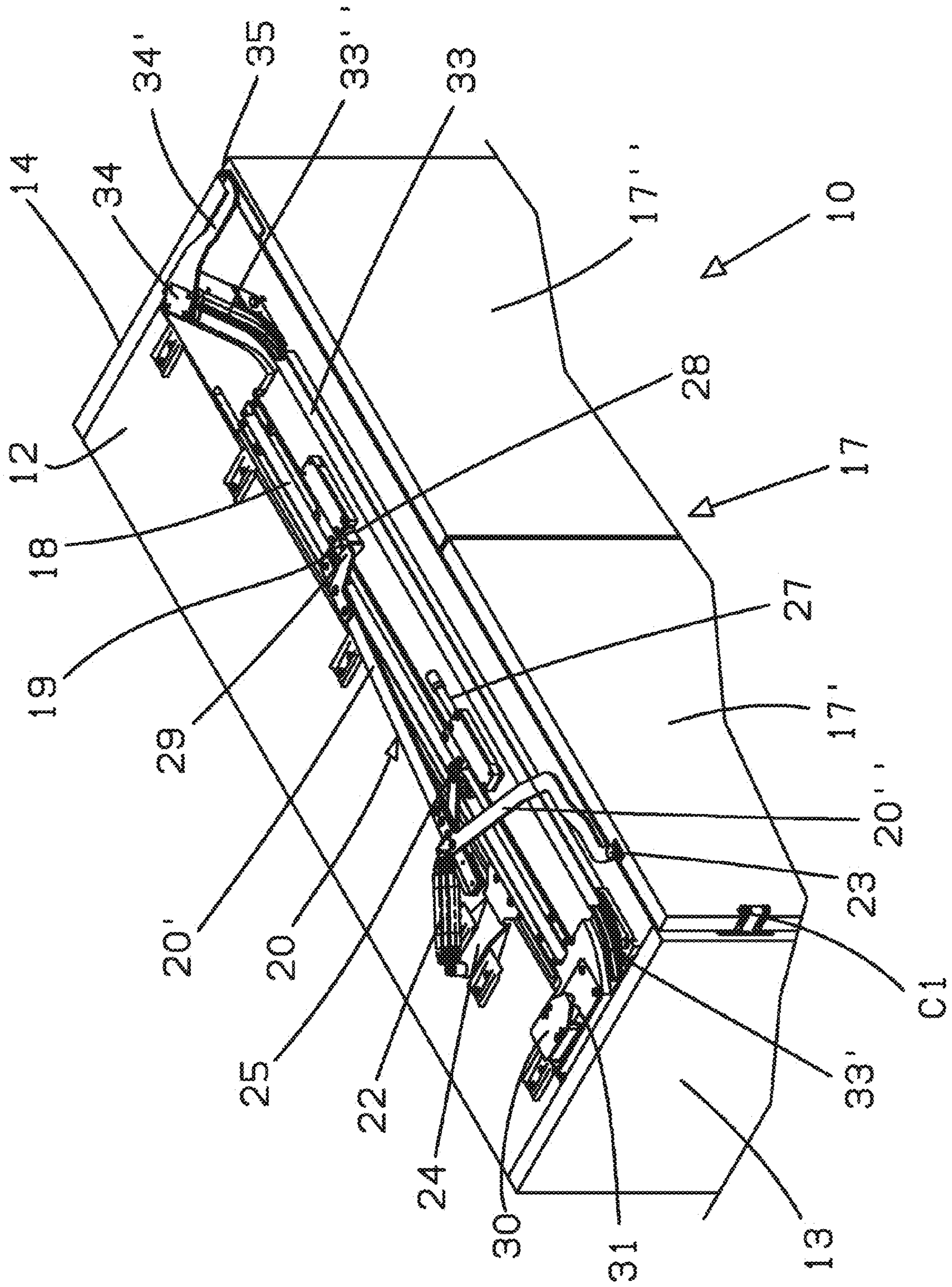
FIG. 1 is a perspective view of a wardrobe equipped with a drive device according to the invention, with the closing door in the closing position.
Figure 2:
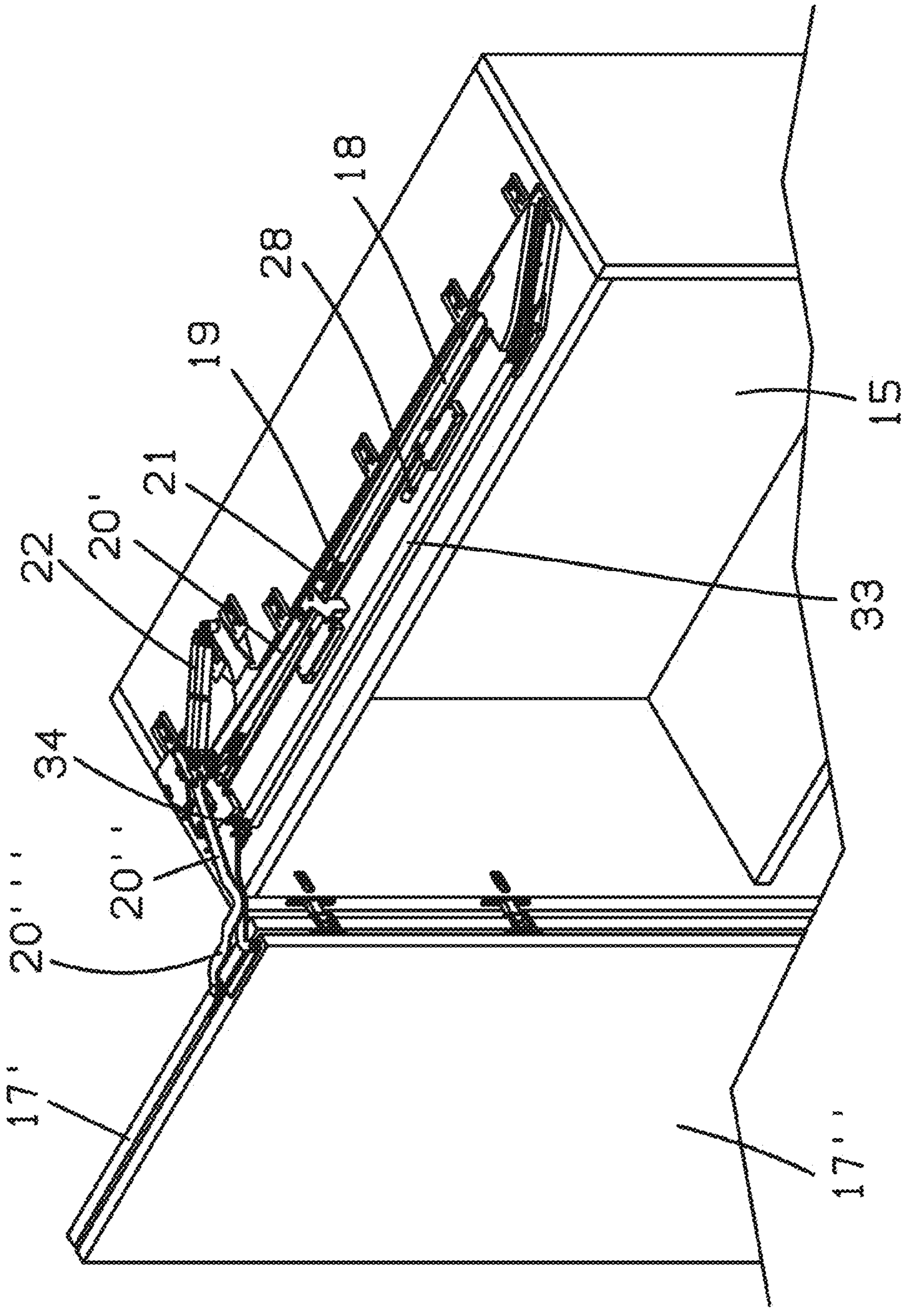
FIG. 2 is the perspective view of the wardrobe in FIG. 1 with the closing door in an opening position.

The figures illustrate a preferential embodiment of the drive device for foldable doors according to this invention, suitable for use in wardrobes, walk-in closets or pieces of furniture in general.

The embodiment illustrated in the figures is particularly applied to a wardrobe, as a whole indicated with the reference number 10, which comprises a box-shaped body or structure with a lower horizontal wall 11, an upper horizontal wall 12, lateral walls 13, 14 and a rear wall 15 defining an internal containment compartment accessible through a front opening 16 of the wardrobe.

Figure 3:
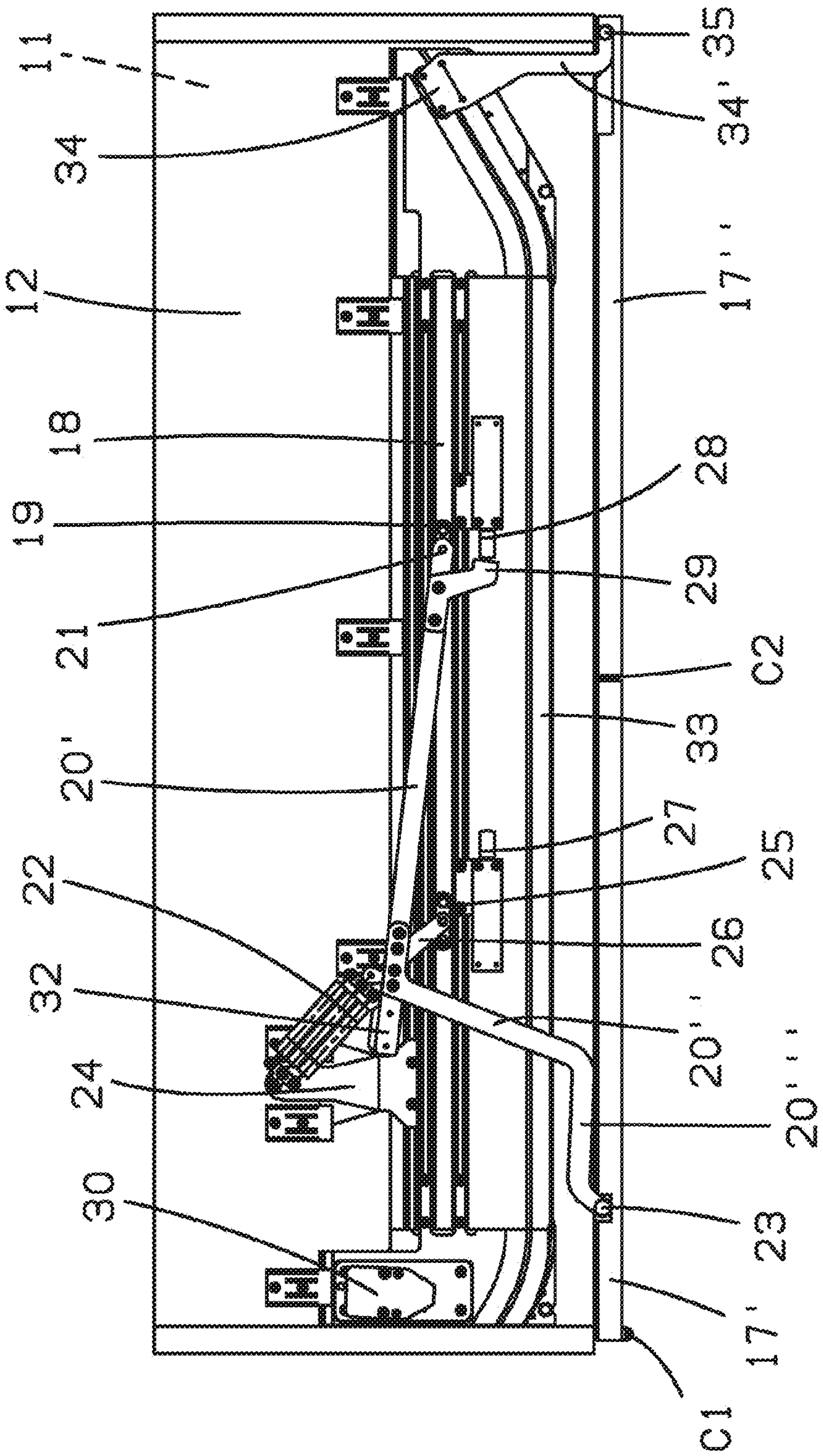
FIG. 3 is a plan view of the wardrobe in FIG. 1 with the closing door in the closing position.
Figure 4:
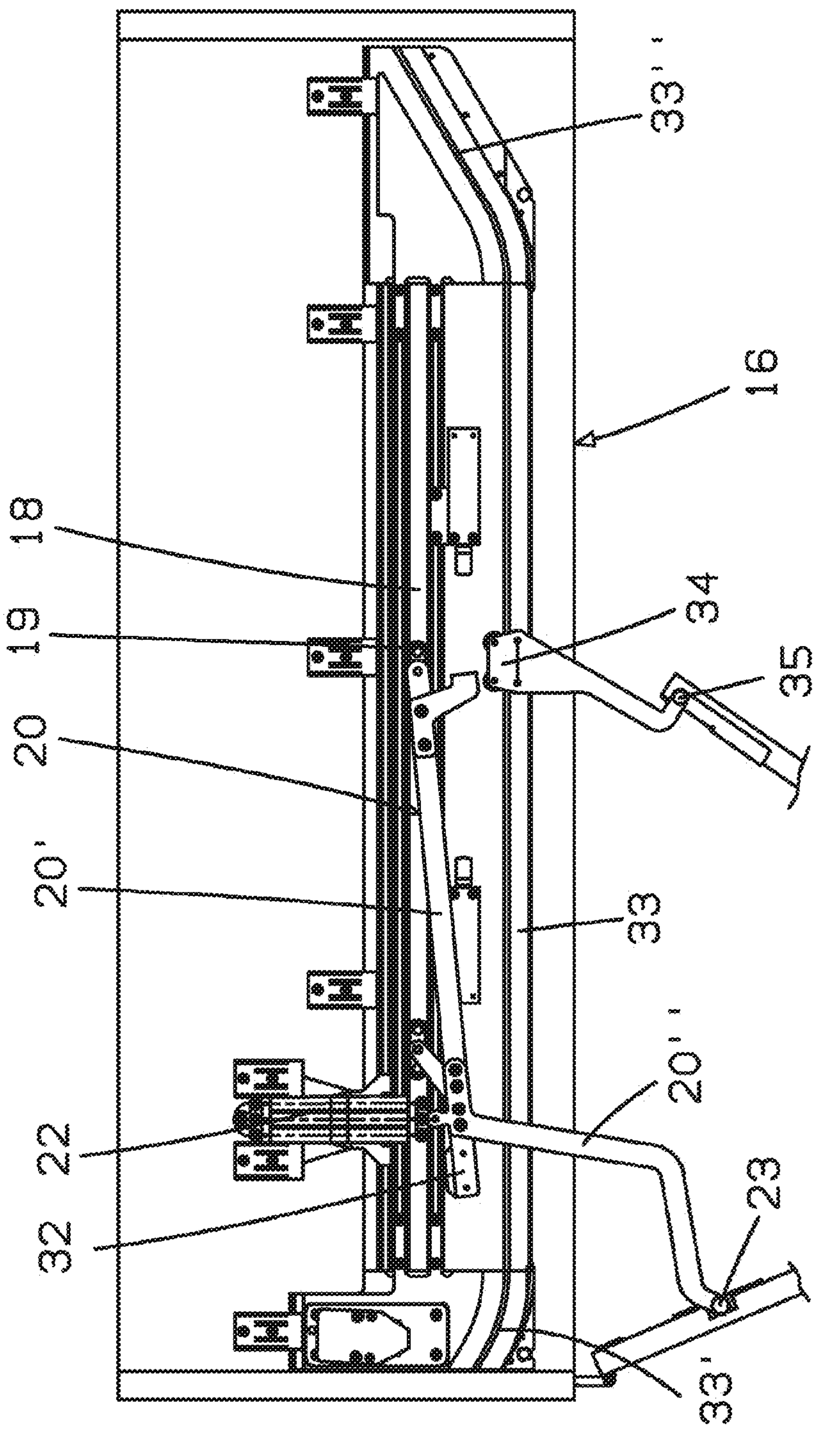
FIG. 4 is a plan view of the wardrobe in FIG. 1 with the closing door in an intermediate opening position.
Figure 5:
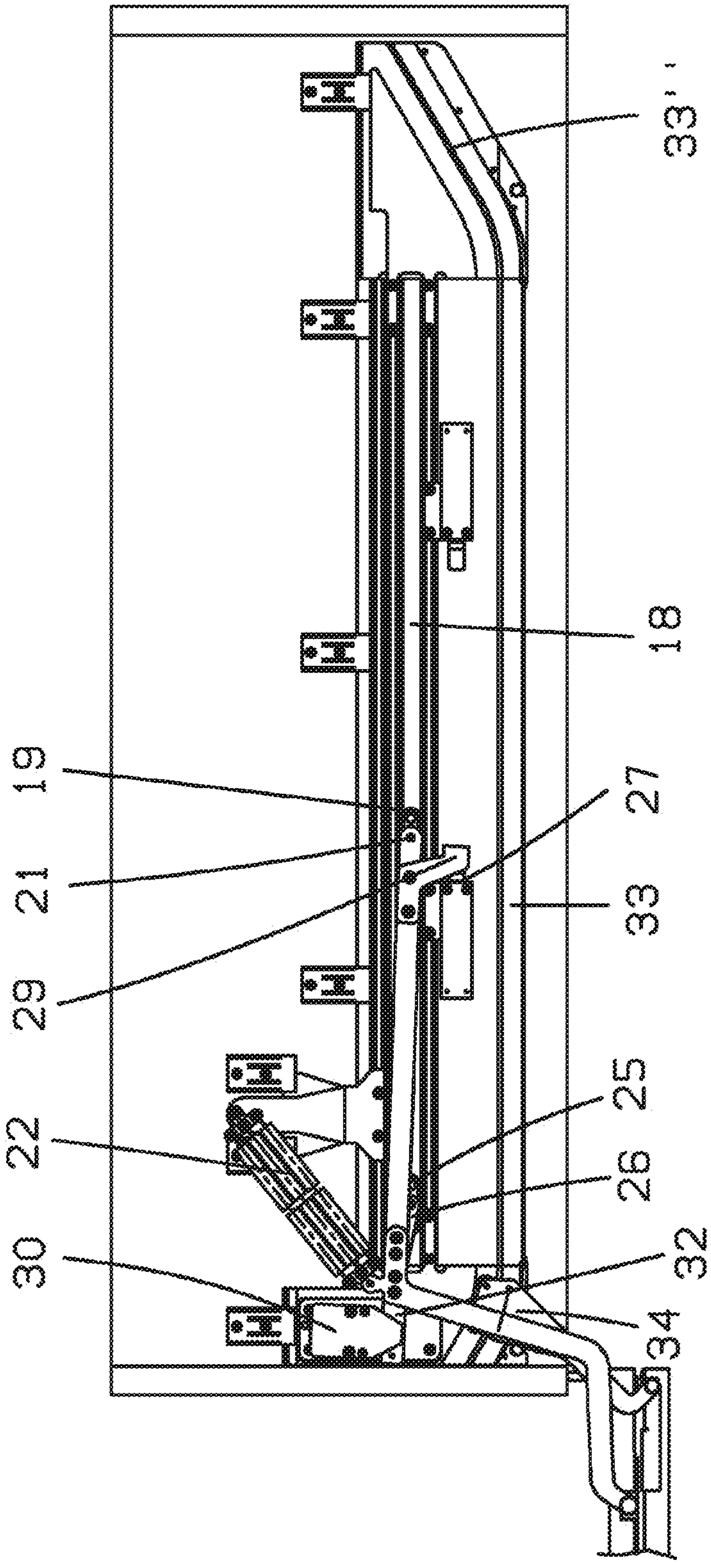
FIG. 5 is a plan view of the wardrobe in FIG. 1 with the closing door in the final opening position.

In order to close the front opening 16, the wardrobe 10 comprises at least one closing door 17 comprising a first leaf 17' hinged to the box-shaped body of the wardrobe 10, for example to the lateral wall 14, by means of hinges C1 and a second leaf 17" hinged to the first leaf 17' by means of hinges C2 in such a way as to be movable between a closing position in which the two leaves 17', 17" are coplanarly arranged with each other on a front side of the wardrobe 10, illustrated in FIGS. 1 and 3, and an opening position in which the two leaves 17', 17" are folded on themselves, arranged towards a side of the wardrobe 10 and the first leaf 17' is preferably rotated up to 180°, as illustrated in FIG. 5.

According to a more general embodiment, the drive device can be fixed to the box-shaped body of the wardrobe 10 or of the piece of furniture and it is connectable to the first 17' or to the second leaf 17" of the closing door 17.

According to the present invention, the drive device comprises a first sliding guide 18 fixable to the upper wall 12 and/or lower wall 11 of the box-shaped body, for example on an upper side of the upper wall 12, longitudinally to the front side of the wardrobe 10.

Preferentially the first sliding guide 18 extends as a whole according to a longitudinal axis which can be parallel or substantially parallel to the front side of the wardrobe 10; however, it is not excluded that the sliding guide 18 may extend inclined with respect to the front side of the wardrobe 10, lying in any case according to the horizontal plane of extension of the upper wall 12 or lower wall 11, depending on the construction characteristics and the movement needs of the closing door 17.

Subject to the substantially longitudinal extension of the sliding guide 18, this can be rectilinear or suitably shaped, for example, providing appropriate curvilinear strokes according to the law of movement to be imposed on the closing door 17.

The drive device also comprises at least one first guide slider 19 slidingly movable along the sliding guide 18; preferentially the guide slider 19 can be configured as a trolley equipped with appropriate rollers able to improve its sliding.

The drive device further comprises at least one drive member 20 rotatably connected to the first guide slider 19, for example by means of an articulation axis 21 and rotatably connectable to the first 17' or to the second leaf 17" of the closing door 17.

The drive device according to the invention also comprises biasing means 22 connected to the drive member 20 for driving the closing and/or opening movement of the closing door 17.

Preferentially the drive member 20 is rotatably connected to the first leaf 17', for example by means of an articulation axis 23 or by means of a suitable hinge to be fixed to the leaf; this solution, that provides the connection to the first leaf 17' is simpler from a constructive point of view.

However, it is not excluded that the drive member 20 may be connected to the second leaf 17"; in this case the construction solution is more complex, requiring for example a specific conformation of the sliding guide and/or the need to construct the drive member telescopically in order to ensure a sufficiently wide movement for the drive device.

Preferentially the drive member 20 is conformed as a suitably shaped lever 20 in order to allow a more effective connection with the biasing means 22 and in order to make said lever less visible in the opening position of the door 17.

The drive lever 20 according to the preferential illustrated embodiment has a conformation with several angled arms, in particular a first lever arm 20' extending substantially longitudinally to the front side of the wardrobe and which is connected at an end of the same one to the first guide slider 19 by an articulation axis 21, a second lever arm 20" which extends angled with respect to the first arm 20' towards the front side of the wardrobe, and a third arm 20'" which extends from the second arm 20" substantially parallel to the first arm 20' and ending with an angled extension that connects to the door 17' by means of the articulation axis 23.

However, it is not excluded that the drive member may be differently shaped or that it may be conformed in several parts movable between them; it is also not excluded that the drive member may perform a controlled tilting movement for example through cam control means provided along the sliding guide.

The biasing means 22 preferentially comprise at least one helical spring, more preferentially at least two helical springs 22 arranged side by side and having a first end connected to a rotatable anchoring element 24 fixed on a side of the first sliding guide 18 in an adjustable way to the same one or directly fixable to the upper 12 or lower 11 horizontal wall of the wardrobe on which the drive device is arranged and a second end connected to the drive member 20; the adjustment of the anchoring element 24 can take place parallel to the sliding guide 18 or even orthogonally.

Thanks to the adjustment of the anchoring element 24 it is possible to stress the drive member with variable forces depending on the configuration and on the weight of the closing door 17.

Preferentially the second end of the springs 22 is connected to the first arm 20' or to the second arm 20" of the drive member 20, for example in correspondence of the area where the first and second arm 20', 20" connect to each other.

As an alternative to the helical springs, biasing means may comprise other types of elastic devices or one or more biasing devices such as magnetic or electric or any other type able to generate the necessary force to drive the movement of the closing door 17.

Preferentially a damping device, for example a linear fluid damper, can be provided axially to the biasing means 22 or coaxially in the biasing means 22 in order to better control the movement of the drive member 20.

In the embodiment illustrated, the drive member 20, in order to impose on the closing door 17 the opening and/or closing movement, in turn performs a roto-translation movement due to the sliding movement given by the first guide slider 19 and by the tilting movement of the drive member 20 around the articulation axis 21 to said guide slider 19; in particular, the drive member 20 moves along the sliding guide 18 between a first position moved towards hinges C1, at the opening position of the door 17, and a second opposite position in which the drive member 20 has moved away from hinges C1 at the closing position of the door 17.

In order to allow an adaptation to pieces of furniture with different sizes, the sliding guide 18 can be supplied in a simple way with different lengths in such a way as to ensure the necessary stroke for the drive member 20; moreover, said drive member 20 can be easily shaped in a different way by changing the lengths of its arms 20', 20", 20".

Preferentially, in order to optimally guide and support the drive member 20, the drive device comprises a second guide slider 25 slidably movable along the sliding guide 18, for example configured as a trolley equipped with appropriate rollers able to improve its sliding, which second guide slider 25 is arranged and movable in a position spaced apart from the first slider 19 and connected to the first arm 20' of the drive member 20 by means of a tilting lever 26; thanks to the second slider 25, oscillations and collisions of the drive member 20 with the other parts of the device are avoided.

In order to control the opening and/or closing movement of the door 17, particularly at the final opening and closing positions, the drive device preferentially comprises suitable damping devices, for example a first 27 and a second 28 damping device arranged spaced apart with each other along the sliding guide 18 to contact and/or to be actuated by an actuation element 29 connected to the drive member 20, preferentially consisting of a lateral protrusion 29 provided on the first arm 20' at the articulation axis 21 with the first guide slider 19.

In particular, at the end of the opening movement, the actuation element 29 actuates the first damping device 27 when the drive member 20 moves towards its first position shifted in the direction of hinges C1, while at the end of the closing movement the actuation element 29 actuates the second damping device 28 when the drive member 20 moves in the opposite direction towards its second position.

The damping devices 27, 28 are preferentially in the form of hydraulic or pneumatic damping cylinders, for example linear dampers or oil cylinders; however, it is not excluded that other devices may be used that can still guarantee the necessary damping of the movement of drive member 20.

An end-stroke device 30 is preferentially provided, for example arranged at an end section of the sliding guide 18 on the C1 hinge side, comprising a stop 31 conformed to contact a part of the drive member 20, for example with an extension 32 of the first arm 20' of the drive member 20, at the final opening position of the closing door 17.

The end-stroke device 30 is preferentially adjustable in position, for example by adjusting the overall position of the end-stroke device along special slots, in such a way as to allow the adjustment of the final opening position of the door.

In order to further control and dampen the opening movement of the door, the end-stroke device preferentially is in turn provided with a damping device conformed to contact the drive member 20 at the final opening position of the door; for example, the stop 31 may be defined by the rod or by the cylinder of one or more linear oil dampers arranged in the end-stroke device 30.

The drive device according to the invention preferentially is associated or associable with a guide device to guide the movement of at least the second leaf 17" of the door 17 in such a way as to jointly constitute a guide and drive system for the foldable leaves 17', 17".

The guide device can be integrated or solidly connected to the drive device for easy assembly on the wardrobe 10 or it can be a separate device.

The guide device preferentially comprises a second sliding guide 33 fixable to the upper horizontal wall 12 and/or lower 11 of the box-shaped body of the wardrobe 10 longitudinally to the front side of the wardrobe, and a further, in particular a third guide slider 34 slidably movable along the second sliding guide 33, in which the third guide slider 34 is rotatably connected at least to the second leaf 17" of the closing door 17.

Preferentially the third slider 34, for the purpose of connection with the second leaf 17 "has an arm 34' which extends towards the front side of the wardrobe 10, at which end a hinge or hinge axis 35 is provided, connectable to the second leaf 17" of the door.

Preferentially, in order to optimize and make the movement of the closing door 17 smoother, the second sliding guide 33 has end sections shaped or conformed as cams 33', 33".

The sliding guides 18 and 33 can be built in a single body, but it is not excluded to possibly realize them separately for flexibility, customization and/or production needs.

However, it is not excluded that in combination with the drive device according to the invention a guide device of another kind for the door leaves may be associated, for example a tilting lever or an articulated quadrilateral of a known type.

From the above it is clear that the drive device according to the invention achieves the purposes mentioned, as it is easily adaptable to wardrobes or pieces of furniture of different sizes, in particular by providing an appropriate shape of the drive member and/or by providing sliding guides for the drive member with modular lengths in such a way as to have the necessary stroke and/or providing to adjust the action of the biasing means.

Moreover, the drive device as well as a guide and drive system according to the invention allow to effectively drive and control the closing and/or opening movement of at least one closing door while allowing to modify the overall movement of said closing door.

Furthermore the drive device and the guide and drive system according to the invention are conformed in such a way that the two leaves 17', 17", in the opening position, are folded on themselves, arranged towards a side of the wardrobe 10 and the first leaf 17' is preferably rotated up to 180°.

The control device according to the invention and the guide and drive system are in any case subject to modifications and variants falling within the scope of the inventive concept; moreover, the construction details can be replaced by technically equivalent elements.

The invention claimed is:

1. A drive device for foldable doors of wardrobes, walk-in closets or pieces of furniture in general having a box-shaped body with at least one horizontal upper and/or lower wall and at least one closing door comprising a first leaf hinged to the box-shaped body of the wardrobe or of the piece of furniture and a second leaf hinged to the first leaf in such a way to be movable between a closing position in which the two leaves are coplanarly arranged with each other on a front side of the wardrobe and an opening position in which the two leaves are folded on themselves and arranged towards a side of the wardrobe, the drive device being fixable to the box-shaped body of the wardrobe or of the piece of furniture and connectable to one of said first and second leaf of the closing door, characterized by comprising:

a sliding guide fixable to said at least one horizontal wall of the box-shaped body longitudinally to the front side of the wardrobe, at least one guide slider slidably movable along said sliding guide, at least one drive member rotatably connected to said at least one guide slider and rotatably connectable to said first or said second leaf of the closing door, biasing means connected to said drive member for driving said closing and/or opening movement of the closing door, and a guide device for guiding at least said second leaf of the closing door, the guide device comprising a second sliding guide fixable to said at least one horizontal wall of the box-shaped body longitudinally to the front side of the wardrobe, and a further guide slider slidably movable along said second sliding guide, wherein said further guide slider is rotatably connected at least to said second leaf of the closing door, wherein the second sliding guide has end sections shaped or conformed as cams.

2. The drive device according to claim 1, characterized in that said sliding guide extends as a whole according to a longitudinal axis which in the mounting condition on the wardrobe is parallel or substantially parallel to a front side of the wardrobe.

3. The drive device according to claim 1, characterized in that said drive member is rotatably connectable to the first leaf of the closing door.

4. The drive device according to claim 1, characterized in that the drive member is conformed as a suitably shaped lever comprising a plurality of angled arms, said plurality of angled arms comprising a first lever arm extending substantially longitudinally to the front side of the wardrobe and which is connected at an end of the same one to the guide slider by an articulation axis and a second lever arm which extends angled with respect to the first arm towards the front side of the wardrobe and which extends for connection to the leaf by an articulation axis.

5. The drive device according to claim 1, characterized in that said biasing means comprise at least one elastic, magnetic or electric device, wherein said biasing means comprise at least one helical spring having a first end connected to a rotatable anchoring element fixed on a side of the sliding guide in an adjustable way longitudinally to the same one or directly fixable to the upper and/or lower horizontal wall of the wardrobe on which the drive device is arranged and a second end connected to the drive member.

6. The drive device according to claim 1, characterized by comprising a second guide slider slidably movable along the sliding guide, wherein the second guide slider is connected to the first arm of the drive member by a tilting lever.

7. The drive device according to claim 1, characterized by comprising damping devices comprising a first and a second damping device arranged spaced apart with each other along the sliding guide to be actuated by an actuation element connected to the drive member.

8. The drive device according to claim 1, characterized by comprising an end-stroke stop device adjustable in position, comprising a stop conformed to contact a part of the drive member at the final opening position of the closing door, wherein the end-stroke stop device is provided with a damping device conformed to contact the drive member at the final opening position of the door.

9. The guide and drive system according to claim 1, characterized in that the guide device is integrated with or integrally connected to the drive device.

10. A drive device for foldable doors of wardrobes, walk-in closets or pieces of furniture in general having a box-shaped body with at least one horizontal upper and/or lower wall and at least one closing door comprising a first leaf hinged to the box-shaped body of the wardrobe or of the piece of furniture and a second leaf hinged to the first leaf in such a way to be movable between a closing position in which the two leaves are coplanarly arranged with each other on a front side of the wardrobe and an opening position in which the two leaves are folded on themselves and arranged towards a side of the wardrobe, the drive device being fixable to the box-shaped body of the wardrobe or of the piece of furniture and connectable to one of said first and second leaf of the closing door, characterized by comprising:

a sliding guide fixable to said at least one horizontal wall of the box-shaped body longitudinally to the front side of the wardrobe, at least one guide slider slidably movable along said sliding guide, at least one drive member rotatably connected to said at least one guide slider and rotatably connectable to said first or said second leaf of the closing door, biasing means connected to said drive member for driving said closing and/or opening movement of the closing door, and damping devices comprising a first and a second damping device arranged spaced apart with each other along the sliding guide to be actuated by an actuation element connected to the drive member.

11. A drive device for foldable doors of wardrobes, walk-in closets or pieces of furniture in general having a box-shaped body with at least one horizontal upper and/or lower wall and at least one closing door comprising a first leaf hinged to the box-shaped body of the wardrobe or of the piece of furniture and a second leaf hinged to the first leaf in such a way to be movable between a closing position in which the two leaves are coplanarly arranged with each other on a front side of the wardrobe and an opening position in which the two leaves are folded on themselves and arranged towards a side of the wardrobe, the drive device being fixable to the box-shaped body of the wardrobe or of the piece of furniture and connectable to one of said first and second leaf of the closing door, characterized by comprising:

a sliding guide fixable to said at least one horizontal wall of the box-shaped body longitudinally to the front side of the wardrobe, at least one guide slider slidably movable along said sliding guide, at least one drive member rotatably connected to said at least one guide slider and rotatably connectable to said first or said second leaf of the closing door, biasing means connected to said drive member for driving said closing and/or opening movement of the closing door, an end-stroke stop device adjustable in position, comprising a stop conformed to contact a part of the drive member at the final opening position of the closing door, wherein the end-stroke stop device is provided with a damping device conformed to contact the drive member at the final opening position of the door.

* * * * *